(12) United States Patent
You

(10) Patent No.: US 8,572,702 B2
(45) Date of Patent: Oct. 29, 2013

(54) SERVER AND METHOD FOR PASSWORD RECOVERY

(75) Inventor: Qiang You, Shenzhen (CN)

(73) Assignees: Fu Tai Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/424,391

(22) Filed: Mar. 20, 2012

(65) Prior Publication Data

US 2013/0174236 A1    Jul. 4, 2013

(30) Foreign Application Priority Data

Dec. 28, 2011  (CN) .......................... 2011 1 0447696

(51) Int. Cl.
*H04L 29/06*    (2006.01)
*G06F 7/04*    (2006.01)
*G06F 15/16*    (2006.01)
*G06F 17/30*    (2006.01)

(52) U.S. Cl.
USPC ....................................... 726/6; 726/5; 726/7

(58) Field of Classification Search
None
See application file for complete search history.

(56) References Cited

U.S. PATENT DOCUMENTS

| 7,861,287 | B2 * | 12/2010 | Pomerantz | 726/6 |
| 2007/0250914 | A1 * | 10/2007 | Fazal et al. | 726/5 |
| 2010/0235897 | A1 * | 9/2010 | Mason et al. | 726/7 |
| 2011/0041166 | A1 * | 2/2011 | Mani | 726/6 |

* cited by examiner

*Primary Examiner* — Shin-Hon Chen
(74) *Attorney, Agent, or Firm* — Altis & Wispro Law Group, Inc.

(57) ABSTRACT

An exemplary password recovery method is applied on a server. The server is connected to one user terminal. The server stores email addresses and email boxes associated with the corresponding email address. Each email box includes emails sent to each corresponding email address. Each email may be a registration email that includes a website and a username. The method receives a password recovery request for a submitted email address of a user, and determines whether there is a registration email in the email box. If yes, the method obtains the website and the username. The method then controls the user terminal to display the prompt information corresponding to the obtained website. Further, the method receives the input username, and determines whether the input username matches the obtained username. If yes, the method generates a new email password, and controls the user terminal to display the new email password.

10 Claims, 2 Drawing Sheets

SERVER AND METHOD FOR PASSWORD RECOVERY

BACKGROUND

1. Technical Field

The present disclosure relates to servers and password recovery methods and, particularly, to a server capable of recovering email password according to the received email and a password recovery method.

2. Description of Related Art

A typical password recovery process for an email account, which often demands numerous user inputs before a new password is finally assigned, is tedious and inconvenient. A quick and secure way of recovering a password is desired.

BRIEF DESCRIPTION OF THE DRAWINGS

The components of any of the drawings are not necessarily drawn to scale, the emphasis instead being placed upon clearly illustrating the principles of the present disclosures.

DETAILED DESCRIPTION

Figure 1:
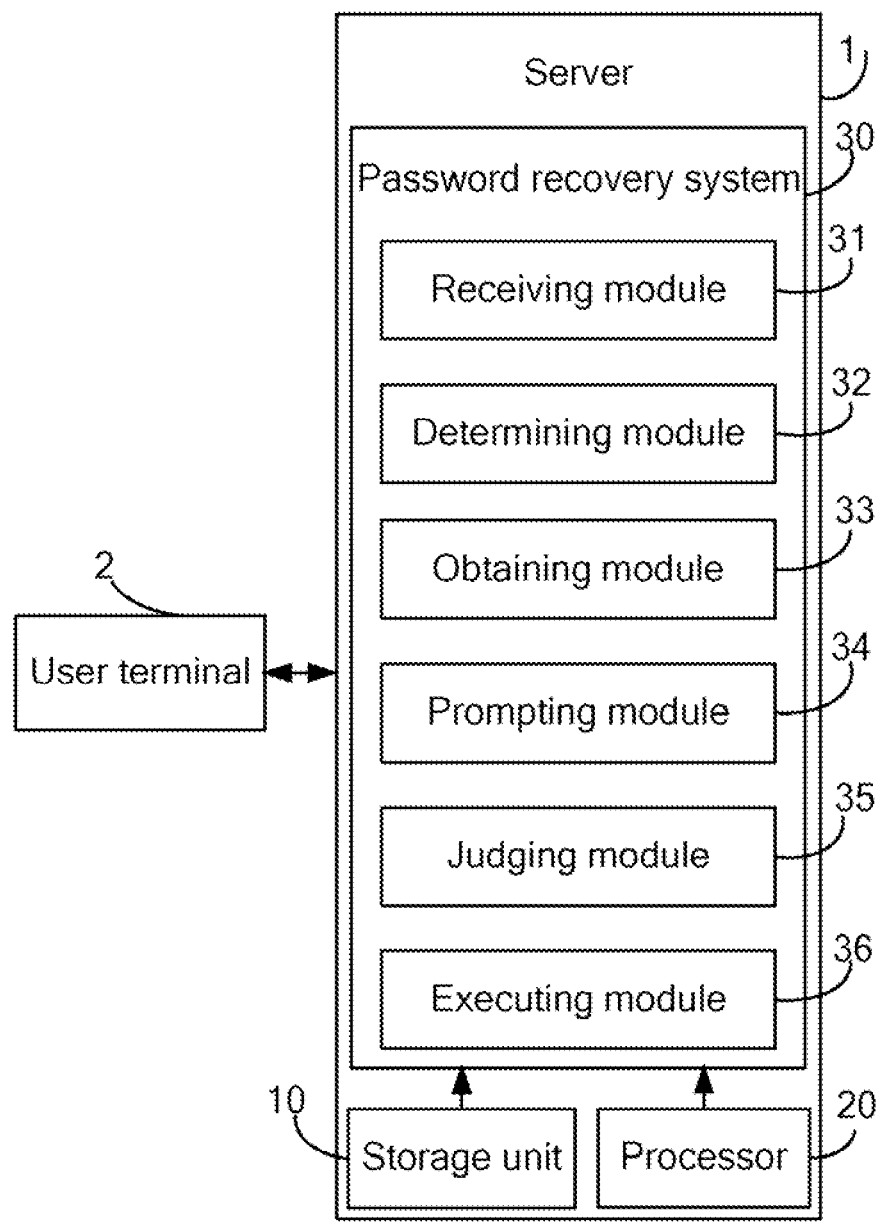
FIG. 1 is a block diagram of a server in accordance with an exemplary embodiment.

Referring to FIG. 1, a server 1 is connected to at least one user terminal 2. The server 1 communicates with the at least one user terminal 2. The server 1 can determine whether a user is an authentic user based on a user input through one of the at least one user terminal 2, and further display a new email password on the corresponding user terminal 2 when the user is an authentic user.

The server 1 includes a storage unit 10, a processor 20, and a password recovery system 30. The storage unit 10 stores a database storing a number of email addresses and a number of passwords associated with each email address. In the embodiment, it is assumed that a registration email will be sent to a user's email address, and the registration email may include a website of a service provider and a username that was set when the user registered for a web service, here the webs service means any networked services, including but not limited to email services. For example, when the user registered for a web service in qq.com, qq.com will send one registration email to a preset email joesmith0807@sohu.com, the registration email includes the website of a service provider qq and the username 395812345. In the embodiment, the storage unit 10 further stores a number of email boxes associated with the corresponding email address. Each email box includes a number of emails sent to the corresponding email addresses.

In the embodiment, the password recovery system 30 includes a receiving module 31, a determining module 32, an obtaining module 33, a prompting module 34, a judging module 35, and an executing module 36. One or more programs of the above-mentioned function modules may be stored in the storage unit 10 and executed by the processor 20.

The receiving module 31 is to receive a password recovery request for a submitted email address of a user, for example a password recovery request for joesmith0807@sohu.com.

The determining module 32 is to search for any registration emails in the user's email box associated with the submitted email address stored in the storage unit 10 that the email box receives when the user registered for a web service, to determine whether there is one or more registration emails in the email box associated with the submitted email address. When the determining module 32 determines that there is one or more registration emails in the email box associated with the submitted email address, the determining module 32 further determines whether the number of the registration email is more than one.

When the number of the registration emails is more than one, the obtaining module 33 randomly picks up one registration email, and obtains the website of a service provider and the username that was set when the user registered a service in the website from the picked up registration email. When the number of the registration email is one, the obtaining module 33 obtains the website of a service provider and the username that was set when the user registered a service in the website from the determined registration email. In an alternative embodiment, it is assumed that the registration email further may include a passcode corresponding to the username that was set when the user registered a service in the website, and the obtaining module 33 further obtains the passcode from the registration email.

The prompting module 34 is to generate prompt information according to the obtained website of the service provider, and further to control the user terminal 2 to display the prompt information to prompt the user to input username corresponding to the website of the service provider. For example, when there is a website www.qq.com in the registration email, the prompting module 34 generates prompt information "what is the username registered in www.qq.com" and controls the user terminal 2 to display the prompt information. In an alternative embodiment, the prompting module 34 may further control the user terminal 2 to display the prompt information to prompt the customer to input passcode corresponding to the username. For example, when there is a website www.qq.com in the registration email, the prompting module 34 generates prompt information "what is the username and passcode when you register in www.qq.com" and controls the user terminal 2 to display the prompt information.

The judging module 35 is to receive the input username corresponding to the website of the service provider in response to user input, and to determine whether the input username corresponding to the website of the service provider matches the obtained username that was set when the user registered a service in the website.

When the input username corresponding to the website of the service provider matches the obtained username that was set when the user registered a service in the website, the executing module 36 generates a new password and further controls the user terminal 2 to display the new password.

In the embodiment, the executing module 36 further replaces the password corresponding to the email address with the new email password corresponding to the email address in the storage unit 10, and associates the new email password with the email address, thus the customer can login the email box with the email address and the new email password.

Figure 2:
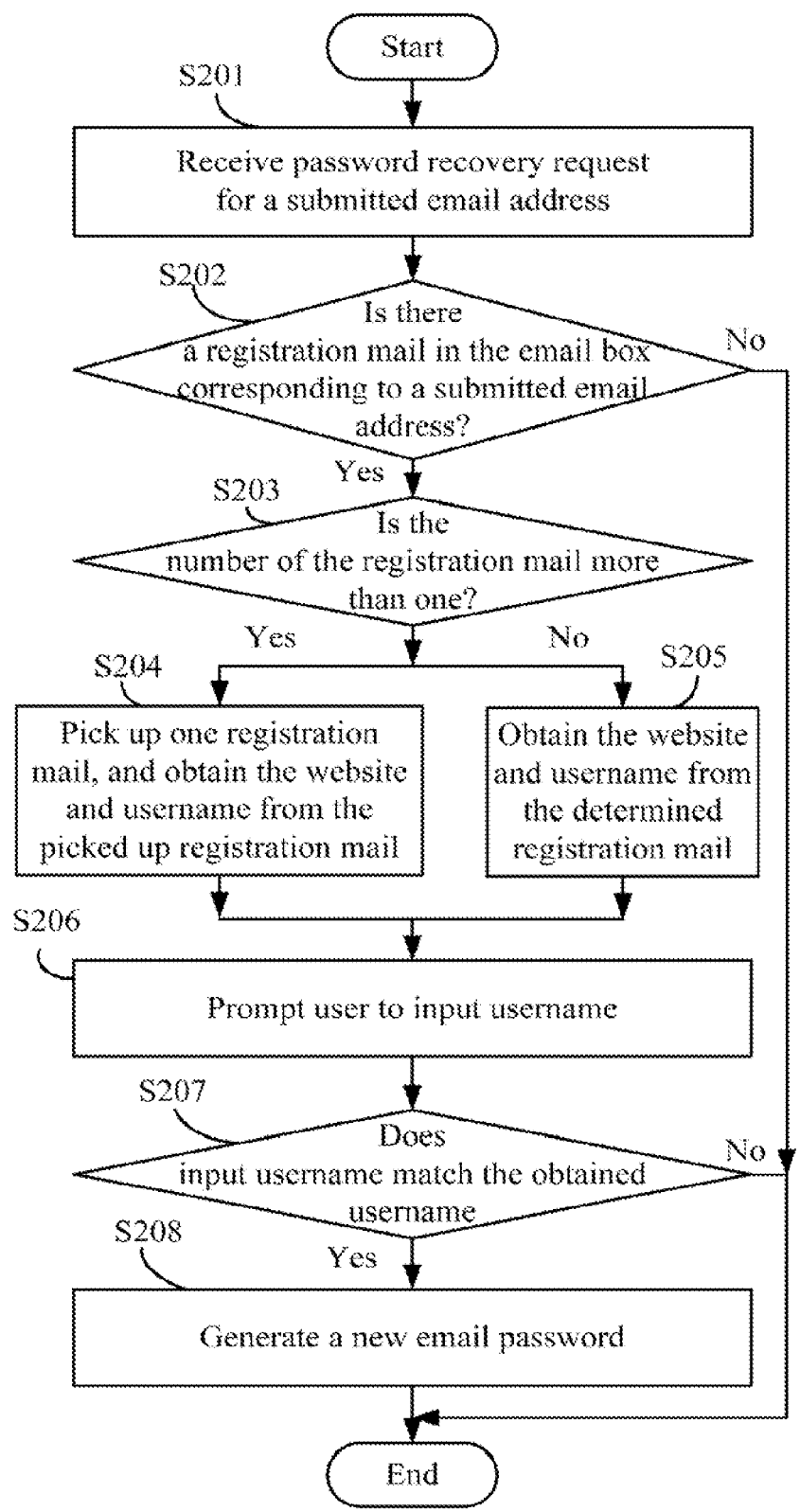
FIG. 2 is a flowchart of a password recovery method in accordance with an exemplary embodiment.

Referring to FIG. 2, a flowchart of a password recovery method is showed.

In step S201, the receiving module 31 receives a password recovery request for a submitted email address of a user.

In step S202, the determining module 32 searches for any registration emails in the user's email box associated with the submitted email address stored in the storage unit 10 that the email box receives when the user registered for a web service, and further determines whether there is one or more registration emails in the email box. When there is one or more registration emails in the email box, the procedure goes to step S203. When there is no registration email in the email box, the procedure stops at step S202.

In step S203, the determining module 32 determines whether the number of the registration emails is more than one. If the number of the registration emails is more than one, the procedure goes to step S204. If the number of the registration emails is one, the procedure goes to step S205.

In step S204, the obtaining module 33 randomly picks up one registration email, and obtains the website of the service provider and the username that was set when the user registered a service in the website from the picked up registration email.

In step S205, the obtaining module 33 obtains the website of a service provider and the username that was set when the user registered a service in the website from the determined registration email.

In step S206, the prompting module 34 generates prompt information according to the obtained website of the service provider, and further controls the user terminal 2 to display the prompt information to prompt the customer to input username corresponding to the website of the service provider.

In step S207, the judging module 35 receives the input username corresponding to the website of the service provider, and determines whether the input username corresponding to the website of the service provider matches the obtained username that was set when the user registered a service in the website. If the input username corresponding to the website of the service provider matches the obtained username that was set when the user registered a service in the website, the procedure goes to step S208. If the input username corresponding to the website of the service provider does not match the obtained username that was set when the user registered a service in the website, the procedure stops at step S207.

In step S208, the executing module 36 generates a new email password and further controls the user terminal 2 to display the new email password.

In the embodiment, the display of the new email password is performed before the executing module 36 associates the new email password with the email address.

In detail, the executing module 36 further replaces the password corresponding to the email address with the new email password corresponding to the email address in the storage unit 10, and associates the new email password with the email address. In this way, the customer can login the email with the email address and the new email password.

Although the present disclosure has been specifically described on the basis of the exemplary embodiments thereof, the disclosure is not to be construed as being limited thereto. Various changes or modifications may be made to the embodiments without departing from the scope and spirit of the disclosure.

What is claimed is:

1. A server connected to at least one user terminal, comprising:
   a storage unit storing a plurality of email addresses and a plurality of email boxes associated with corresponding email address, each of the email boxes comprising a plurality of emails sent to each of the corresponding email addresses, each of the plurality of emails sent to each of the email addresses may being a registration email that at least comprises a website and a username that was set when the user registered a service in the website;
   a processor; and
   one or more program modules stored in the storage unit and executed by the processor, the one or more program modules comprising:
   a receiving module operable to receive a password recovery request for an submitted email address of a user through the at least one user terminal;
   a determining module operable to search for any registration emails in one email box associated with the submitted email address in the storage unit that the email box receives when the user registered for a web service, to determine whether there is any registration email in the email box associated with the submitted email address;
   an obtaining module operable to obtain the website and the username from the registration email determined by the determining module;
   a prompting module operable to generate prompt information according to the obtained website, and further to control the user terminal to display the prompt information to prompt a user to input the username corresponding to the website;
   a judging module operable to receive the input username corresponding to the website, and to determine whether the input username corresponding to the website matches the obtained username that was set when the user registered a service in the website; and
   an executing module operable to generate a new email password when the input username corresponding to the website matches the obtained username that was set when the user registered a service in the website, and control the corresponding user terminal to display the new email password.

2. The server as described in claim 1, wherein the obtaining module is further operable to randomly pick up one registration email when the number of the registration emails is more than one, and further obtain the website and username that was set when the user registered a service in the website from the picked up registration email.

3. The server as described in claim 2, wherein the storage unit further stores a plurality of passwords, each of the passwords corresponds to one of the email addresses, the executing module is further operable to replace the password corresponding to the email address with the new email password, and associate the new email password with the email address.

4. The server as described in claim 2, wherein each of the registration emails further comprises a passcode corresponding to the username, the obtaining module is further operable to obtain the passcode corresponding to the username from the registration email, the prompting module is further operable to control the user terminal to display the prompt information to prompt the customer to input passcode corresponding to the input username.

5. The server as described in claim 2, wherein the obtaining module is operable to obtain the website and the username that was set when the user registered a service in the website from the registration email when the number of the registration email is one.

6. A password recovery method applied on a server, the server being connected to at least one user terminal, the server comprising a storage unit storing a plurality of email addresses and email boxes associated with corresponding email address, each of the email boxes comprising a plurality of emails sent to each of the corresponding email addresses, each of the emails sent to each of the corresponding email addresses may being a registration email that at least comprises a website and a username that was set when the user registered a service in the website, wherein the method comprises:
   receiving a password recovery request for a submitted email address of a user;

searching for any registration emails in the email box associated to the submitted email address in the storage unit that the email box receives when the user registered for a website service, and determining whether there is any registration email in the email box associated with the submitted email address;

obtaining the website and the username that was set when the user registered a service in the website from the registration email when there is registration email in the email box associated with the submitted email address;

generating prompt information according to the obtained website, and controlling a user terminal to display the prompt information to prompt a user to input the username corresponding to the website;

receiving the input username corresponding to the website, and determining whether the input username corresponding to the website matches the obtained username that was set when the user registered a service in the website; and generating a new email password when the input username corresponding to the website matches the obtained username that was set when the user registered a service in the website, and controlling the user terminal to display the new email password.

7. The password recovery method as described in claim 6, wherein the method further comprises:

picking up randomly one registration email when the number of the registration emails is more than one; and obtaining the website and username that was set when the user registered a service in the website from the picked up registration email.

8. The password recovery method as described in claim 7, the storage unit further storing a plurality of passwords, each of the passwords corresponding to one of the email addresses, wherein the method further comprises:

replacing the password corresponding to the email address with the new email password, and associating the new email password with the email address.

9. The password recovery method as described in claim 7, each of the registration emails comprising a passcode corresponding to the username, wherein the method further comprises:

obtaining the passcode corresponding to the username from the registration email; and controlling the user terminal to display the prompt information to prompt the customer to input passcode corresponding to the input username.

10. The password recovery method as described in claim 7, wherein the method further comprises:

obtaining the website and the username that was set when the user registered a service in the website from the registration email when the number of the registration email is one.

\* \* \* \* \*

UNITED STATES PATENT AND TRADEMARK OFFICE
CERTIFICATE OF CORRECTION

PATENT NO. : 8,572,702 B2  
APPLICATION NO. : 13/424391  
DATED : October 29, 2013  
INVENTOR(S) : Qiang You It is certified that error appears in the above-identified patent and that said Letters Patent is hereby corrected as shown below:

Please replace Item (73) regarding "Assignees" with the following:

(73) Assignees: Fu Tai Hua Industry (Shenzhen) Co., Ltd., Shenzhen (CN); Hon Hai Precision Industry Co., Ltd., New Taipei (TW).

Signed and Sealed this  
Third Day of April, 2018

Andrei Iancu  
*Director of the United States Patent and Trademark Office*